United States Patent [19]

Nishiyama et al.

[11] Patent Number: 4,886,256
[45] Date of Patent: Dec. 12, 1989

[54] VEHICLE SUSPENSION DEVICE WITH A COIL SPRING EMBEDDED IN AN OPEN CELL FOAM

[75] Inventors: Masakazu Nishiyama, Tokyo; Takeyoshi Shinbori, Yokosuka; Hideo Yamamoto, Yokohama, all of Japan

[73] Assignee: NHK Spring Co., Ltd., Yokohama, Japan

[21] Appl. No.: 761,298

[22] Filed: Jul. 29, 1985

Related U.S. Application Data

[63] Continuation of Ser. No. 289,257, Aug. 3, 1981, abandoned.

[30] Foreign Application Priority Data

Aug. 5, 1980 [JP] Japan .................... 55-107275
Dec. 1, 1980 [JP] Japan .................... 55-169366

[51] Int. Cl.⁴ .................... B60G 11/52; B60G 11/56
[52] U.S. Cl. .................... 267/221; 267/33; 267/34
[58] Field of Search .................... 267/33, 61 S, 63 R, 267/140.4, 140.3, 152, 153, 90, 84, 143, 170, 178, 179, 140.5, 60, 61 R, 148, 149, 166, 167, 180, 248, 286, 249, 221, 34; 428/317.9; 521/101, 110, 117, 129, 132, 905

[56] References Cited

U.S. PATENT DOCUMENTS

| | | | |
|---|---|---|---|
| 1,639,636 | 8/1927 | Blomgren | 267/140.4 |
| 2,103,946 | 12/1937 | Herr | 267/33 |
| 2,230,069 | 1/1941 | Rushmore | 267/33 |
| 2,564,394 | 8/1951 | Cole | 267/33 X |
| 3,130,964 | 4/1964 | Johnson | 267/33 X |
| 3,298,457 | 1/1967 | Warnaka | 428/317.9 X |
| 3,606,295 | 9/1971 | Appleton | 267/63 R |
| 3,633,228 | 1/1972 | Zysman | 267/84 X |
| 3,831,922 | 8/1974 | Appleton | 267/140 |
| 3,888,766 | 6/1975 | De Young | 521/905 X |
| 3,959,191 | 5/1976 | Kehr et al. | 521/905 X |
| 3,978,011 | 8/1976 | Molbert | 521/132 X |
| 4,024,090 | 5/1977 | von Bonin et al. | 521/110 |
| 4,033,990 | 7/1977 | Omietanski et al. | 521/110 X |
| 4,085,832 | 4/1978 | Gaines et al. | 267/63 R X |
| 4,247,656 | 1/1981 | Janssen | 521/905 X |
| 4,264,743 | 4/1981 | Maruyama et al. | 521/101 |

FOREIGN PATENT DOCUMENTS

| | | | |
|---|---|---|---|
| 2813819 | 10/1979 | Fed. Rep. of Germany | 267/167 |
| 0497008 | 12/1938 | United Kingdom | 267/33 |
| 1063754 | 3/1967 | United Kingdom | 267/153 |

Primary Examiner—Robert J. Oberleitner
Attorney, Agent, or Firm—Frishauf, Holtz, Goodman & Woodward

[57] ABSTRACT

A vehicle suspension device which suspends a vehicle body and a wheel, comprising a coil spring body having a predetermined number of coaxial turns, and a first cylinder and a second cylinder, each including a soft synthetic resin open-cell foam which is treated to be surging-proof and waterproof and which has a wall in which is embedded at least one turn located at each end of said coil spring body.

31 Claims, 4 Drawing Sheets

VEHICLE SUSPENSION DEVICE WITH A COIL SPRING EMBEDDED IN AN OPEN CELL FOAM

This application is a continuation, of application Ser. No. 289,257, filed Aug. 3, 1981, now abandoned.

BACKGROUND OF THE INVENTION

The present invention relates to a vehicle suspension device and, more particularly, to a vehicle suspension device having a coil spring, at least a part of which is coated with a synthetic resin.

A vehicle suspension device having a coil spring is mounted to a vehicle, generally with the coil spring exposed to the exterior. Therefore, the coil spring may corrode due to mud splashed during travel, exposure to rainwater or the like.

To avoid corrosion, it has been proposed that a spring wire be coated with a synthetic resin and then be coiled, thus forming a coil spring. The adjacent turns of such coil spring, however, bang together when the spring undergoes surging vibrations caused by impact applied on it while the vechicle is travelling at a high speed. Banging of the turns tears the resin coating, particularly at the end portions of the spring. Thus, the resin coating cannot successfully protect the spring from corrosion. To prevent corrosion of the coil spring it would be necessary to prevent surging vibrations.

To prevent surging vibrations, it has been proposed that the coil spring be embedded in a cylinder of elastic rubber. Indeed the cylinder may suppress surging vibrations and may also protect the spring from water. But, when the cylinder is compressed, the friction between the elastic rubber and each turn of the coil spring increases so much that the coil-cylinder unit comes to have a large spring constant and inevitably has its spring characteristics degraded.

SUMMARY OF THE INVENTION

The present invention has been made to overcome these problems and has for its object to provide a vehicle suspension device wherein surging vibrations may be prevented, the spring characteristics may not be adversely affected, and corrosion of the coil spring may be prevented.

According to an aspect of the present invention, there is provided a vehicle suspension device comprising a coil spring body having a predetermined number of coaxial turns; and a first cylinder and a second cylinder, each including a soft synthetic resin foam which is treated to be surging-proof and which has waterproof means and a wall in which is embedded at least one turn located at each end of the coil spring body.

DETAILED DESCRIPTION OF THE PREFERRED EMBODIMENTS

The first embodiment of the vehicle suspension device according to the present invention will now be described in detail with reference to a case of a four-wheeled vehicle referring to FIGS. 1 to 3 of the accompanying drawings.

Figure 1:
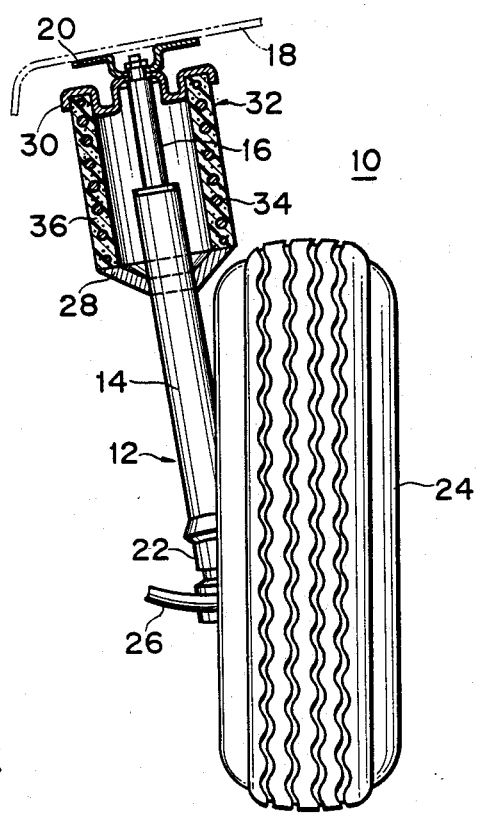
FIG. 1 is a partially sectional, front view of a first embodiment of a vehicle suspension device according to the present invention.

FIG. 1 shows a straddle-type vehicle suspension device 10 for a four-wheeled vehicle i.e. a car. This vehicle suspension device 10 comprises a shock absorber 12. The shock absorber 12 includes a main body 14 in which oil is sealed, and a rod 16 which outwardly extends from the interior of the main body 14 and is coaxial therewith. The rod 16 is pressed into the main body 14 when an impact is exerted thereon, and the impact is absorbed through the oil. The upper end of the rod 16 is securely fixed to a body 18 of the four-wheeled vehicle through a rod holder 20. A steering knuckle 22 is integrally formed with the lower end of the main body 14. A wheel 24 is mounted to the steering knuckle 22 and may be replaced as needed. The lower part of the main body 14 of the shock absorber 12 is supported by a lower arm 26 of the four-wheeled vehicle through the steering knuckle 22.

A dish-shaped lower spring holder 28 is mounted to the upper part of the main body 14 of the shock absorber 12 to be coaxial with the main body 14. A dish-shaped upper spring holder 30 is mounted to the upper part of the rod 16 of the shock absorber 12 to be coaxial with the rod 16. A coil spring assembly 32 is interposed between the lower spring holder 28 and the upper spring holder 30 to be slightly compressed and to be coaxial with the shock absorber 12.

Figure 2:
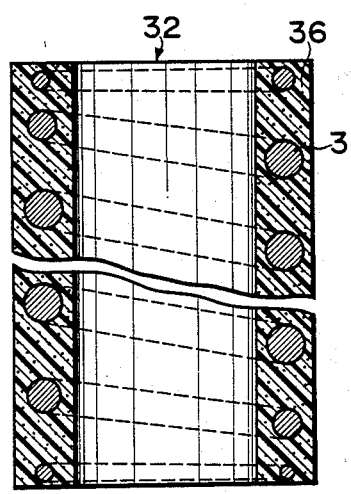
FIG. 2 is a sectional view of the coil spring assembly of the vehicle suspension device shown in FIG. 1.

The coil spring assembly 32, as shown in FIG. 2, has a coil spring body 34 formed of a compression coil spring having opposite end turns and a cylinder 36 which has waterproof means and a wall embedding the overall coil spring body 34 and which is made of foamed soft synthetic resin treated to be surging-proof.

The coil spring body 34 is formed in a cylindrical form having a plurality of turns from a coil wire whose diameter becomes smaller towards the ends. As this coil wire, a steel wire 12 mm in maximum diameter and 6 mm in minimum diameter may be used. The central diameter of the coil spring body 34 is set to be 110 mm; the coil height is set to be 165 mm; and the spring constant is set to be 1.8 kg/mm.

The cylinder 36 includes a soft flexible synthetic resin foam having a uniform density distribution, for example, a soft polyurethane open-cell foam. The cylinder 36 has a wall with coaxial inner and outer circumferential surfaces, having an outer diameter of 132 mm, an inner diameter of 88 mm, and a height of 165 mm. The cylinder 36 defines cylindrical portions at respective opposite end portions of the coil spring body 34. The coil spring body 34 is embedded in the wall of the cylinder 36 to be coaxial therewith. The cylinder 36 with waterproof means is formed of a soft, waterproof polyurethane foam. The polyurethane foam is prepared by the reaction between hydrophobic polyol and isocyanate. It is preferred to add a hydrophobic agent, for example a reactive silicone to the reactants in the reaction step. The foam is mixed with an auxiliary hydrophobic agent such as asphalt. Also, a vibration damping agent such as iron powder may be added to the foam for enabling the foam to exhibit a vibration damping effect.

According to the vehicle suspension device 10 of the construction as described above, the coil spring body 34 is completely embedded in the wall of the cylinder 36 of soft foamed urethane treated to be waterproof. Therefore, mud splashed during travel or rainwater may not permeate the soft polyurethane foam having the hydrophobic property to reach the coil spring body 34, so that corrosion or rusting of the coil spring body 34, which is usually caused thereby, may be prevented. Especially with the first embodiment described above, a special step of coating a rust-resistant paint on the coil spring body 34 is not necessary, so that this coating step of the rust-resistant paint may be eliminated from the conventional steps. Furthermore, pebbles or stones rebounding during travel may not strike the coil spring body 34. Therefore, it becomes unnecessary to mount a dust cover to the coil spring body 34 as in the conventional case. Damage to the coil spring body 34 by being struck by pebbles or stones, which leads to stress concentration at the damaged portion and breakage of the coil spring body 34, may be prevented.

Figure 3:
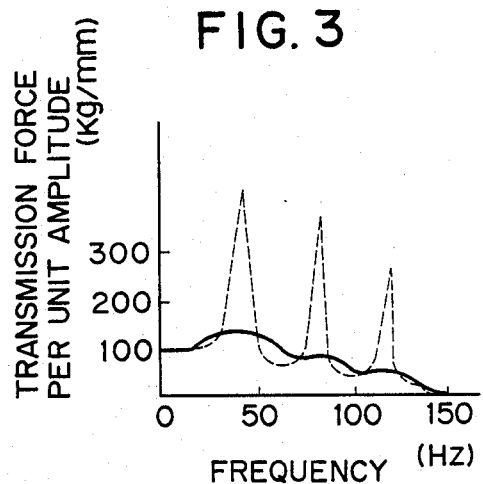
FIG. 3 is a graph showing the correlation between the frequency and the transmission force per unit amplitude of the vehicle suspension device shown in FIG. 1.

Since the cylinder 36 has the soft polyurethane foam containing the vibration damping agent, the generation of surging vibrations in the coil spring assembly 32 is substantially prevented even when the vehicle is subjected to high speed vibrations, as may be seen from the solid line in FIG. 3 showing the correlation between the surging vibration frequency and the transmission force per unit amplitude. In FIG. 3, the broken line shows the surging vibration frequency-transmission force per unit amplitude characteristics obtained with a conventional vehicle suspension device.

Between the adjacent turns of the coil spring body 34 is filled part of the cylinder 36, that is, part of the soft polyurethane foam. Due to this structure, the adjacent turns may not bang together even when a strong impact is exerted on the vehicle. The generation of beating sounds may be prevented as well as damage to the coil spring body 34. Stress concentration at the damaged portion of the coil spring body 34 and breakage of the coil spring body 34 at this part may also be prevented. Since part of the soft polyurethane foam is interposed between each pair of adjacent turns, an excessive load on the vehicle may not result in contact between adjacent turns. Therefore, the rubber-made spring sheet and the bound bumper rubber which have been conventionally required may be eliminated, so that the number of parts used for the vehicle suspension device may be reduced.

Since the polyurethane foam constituting the cylinder 36 is soft and of open-cell type, its resistance, that is, its modulus of elasticity is small so that the spring constant of the coil spring assembly 32 need not be changed very much from the spring constant of the coil spring body 34.

In this embodiment, the description has been made for the cylinder 36 with a soft polyurethane foam. However, the material is not particularly limited to polyurethane, but may be any material which foams the synthetic rubber having open-cells and which is soft; for example, polyvinyl chloride foam, polyethylene foam, ethylene-vinyl acetate copolymer foam, etc. Incidentally, as the hydrophobic agent a non-reactive silicone, for example, dimethyl siloxane, may be added in place of the reactive silicone in the step of producing polyurethane foam.

As the auxiliary hydrophobic agent to be mixed in the soft synthetic resin foam, tar as bitumen, petroleum pitch, petroleum resin, animal oil, plant oil, liquid paraffin, chlorinated paraffin, low-molecular-weight polybutadiene, butylated resin or the like may be used instead of asphalt.

The vibration damping agent to be mixed in the soft synthetic resin foam may be sand powder in place of the iron powder mentioned hereinabove.

The present invention is not limited to the particular construction and specific values described above with reference to the first embodiment, and many modifications and changes may be made within the scope of the present invention. Some of the modifications will be described below. In the description to follow, the same parts as in the first embodiment will be denoted by the same refererence numerals, and the detailed description thereof will be omitted.

Figure 4:
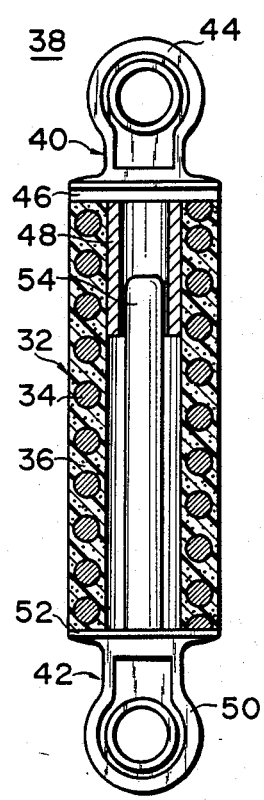
FIG. 4 is a partially sectional, front view of a second embodiment of the vehicle suspension device according to the present invention.

FIG. 4 shows the second embodiment of the vehicle suspension device according to the present invention. In this second embodiment, a vehicle suspension device 38 for a motorized two-wheeled vehicle such as a motorcycle or motor scooter is described. This vehicle suspension device 38 has a first part 40 connected to the body (not shown) of the motorized two-wheeled vehicle, a second part 42 connected to a wheel (not shown), and the coil spring assembly 32 interposed therebetween.

The first part 40 has a first connecting part 44 of doughnut shape which is to be connected to the vehicle body, a first spring seat 46 for receiving the upper end of the coil spring assembly 32, and a cylindrical part 48 projecting from this first spring seat 46 toward the second part 42; these three parts are coaxially integrally formed with each other. The second part 42 has a second connecting part 50 of doughnut shape which is to be connected to the wheel, a second spring seat 52 for receiving the lower end of the coil spring assembly 32, and a rod 54 projecting from this second spring seat 52 toward the first part 40; these three parts are coaxially integrally formed with each other. The inner circumferential surface of the cylindrical part 48 is formed to loosely receive the outer circumferential surface of the rod 54. The lengths of the rod 54 and the cylindrical part 48 are set so that the front end of the rod 54 may be positioned within the cylindrical part 48 when no load is exerted on the vehicle suspension device 38 and the front end of the rod 54 may not be in contact with the bottom surface of the first spring seat 46 under the maximum load condition.

Although the construction of the coil spring assembly 32 is substantially the same as that in the first embodiment, the dimensions of the constituting parts have been changed for application to a two-wheeled vehicle. The inner circumferential surface of the cylinder 36 of the coil spring assembly 32 and the outer circumferential surface of the cylindrical part 48 of the first part 40 are contiguous for holding each other.

Since the second embodiment has the construction as described above, the coil spring assembly 32 is expanded and contracted according to the fluctuations in the load exerted on the vehicle suspension device 38 through the first part 40 and the second part 42. The expansion and contraction of the coil spring assembly 32 simultaneously expands and contracts the coil spring body 34 and the cylinder 36. This cylinder 36 has the soft polyurethane foam and the load exerted on it is relatively smaller than that exerted on the four-wheeled vehicle. Therefore, this soft polyurethane foam acts to attenuate the load impact. The expansion and contraction of the coil spring body 34, that is, the vibrations and impacts acting on the vehicle suspension device 38, may thus be effectively attenuated without a shock absorber.

Figure 6:
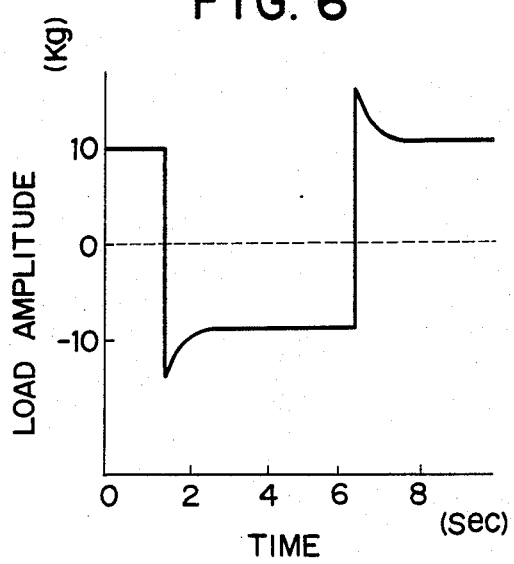
FIG. 6 is a graph showing the load amplitude-time characteristics of the device shown in FIG. 4.
Figure 5:
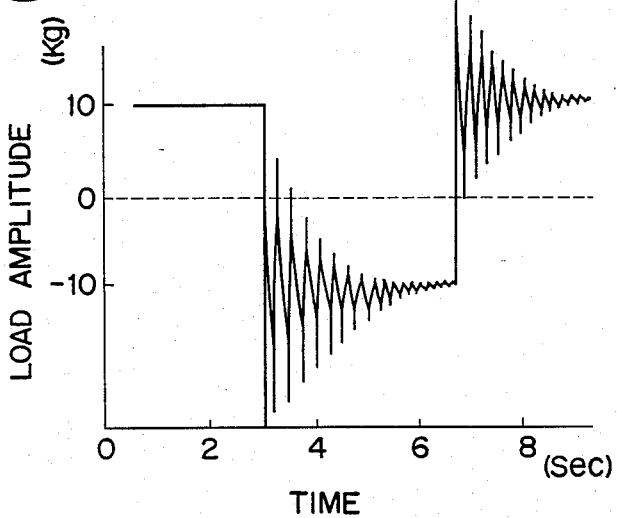
FIG. 5 is a graph showing the load amplitude-time characteristics when the cylinder is taken out of the device shown in FIG. 4.

When a vehicle suspension device does not have the cylinder 36 with the soft polyurethane foam, vibrations are repeatedly generated as may be seen from FIG. 5. In contrast with this, in the second embodiment according to the present invention, the vibrations are effectively absorbed as shown in FIG. 6, and the maximum amplitude is also decreased without particularly incorporating a shock absorber.

The second embodiment of the present invention is advantageous in that, in addition to the effects obtained with the first embodiment described above, the comfort of a two-wheeled vehicle is vastly improved on bad roads without requiring the use of a shock absorber.

Figure 7:
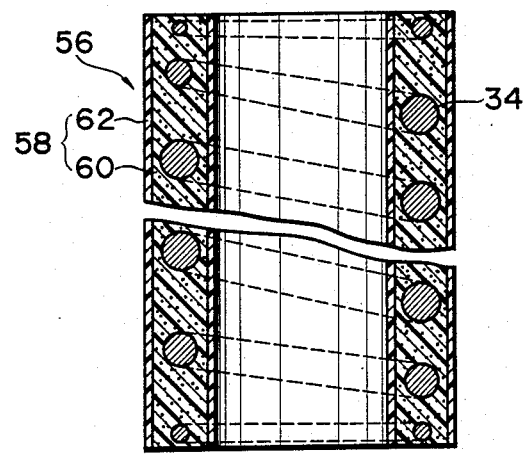
FIG. 7 is a sectional view of the coil spring assembly used in a third embodiment of the vehicle suspension device according to the present invention.

FIG. 7 shows the third embodiment of the vehicle suspension device according to the present invention. In the first and second embodiments described above, the waterproof means for making the soft polyurethane foam waterproof was achieved by using the hydrophobic polyol and mixing a hydrophobic and auxiliary hydrophobic agents in the soft polyurethane foam mixture. However, the waterproof means is not limited to this. For example, as seen from a coil spring assembly 56 shown in FIG. 7, a cylinder 58 of the coil spring assembly 56 may comprise a cylinder body 60 of soft polyurethane foam and a waterproof layer 62 formed over the inner and outer circumferential surfaces of this cylinder body 60. The coil spring body 34 is embedded in the wall of the cylinder body 60. This waterproof layer 62 may be of any material which is capable of preventing water from entering into and preventing impairing softness of the cylinder body 60;
thus it may be of polyethylene, polyurethane, Neoprene, polypropylene, 1,2-polybutadiene, an ethylenevinyl acetate copolymer, vinylidene chloride and so on. The waterproof layer 62, if made of polyethylene, is fitted to the cylinder body 60 by thermal contraction. If it is made of polyurethane, it is adhered to the body 60 with an adhesive or is fitted to the body 60 by thermal contraction, by coating polyurethane on the body 60 or by coating polyurethane on the inner surface of a mold before foam molding of the body 60. A waterproof layer 62 of Neoprene is formed by applying a Neoprene solution to the surface of the cylinder body 60.

Since the third embodiment has the construction as described above, the water from the outside may not reach the coil spring body 34 embedded in the cylinder 58, so that the coil spring body 34 embedded in the cylinder 58 may be completely protected from water. The waterproof means for making the soft polyurethane foam waterproof is not thus limited to using the hydrophobic polyol and mixing a hydrophobic and auxiliary hydrophobic agents in the soft polyurethane foam, but may be achieved by forming the waterproof layer on the surface of the soft polyurethane foam. Similar effects as obtainable with the first embodiment may be obtained with the third embodiment.

Figure 8:
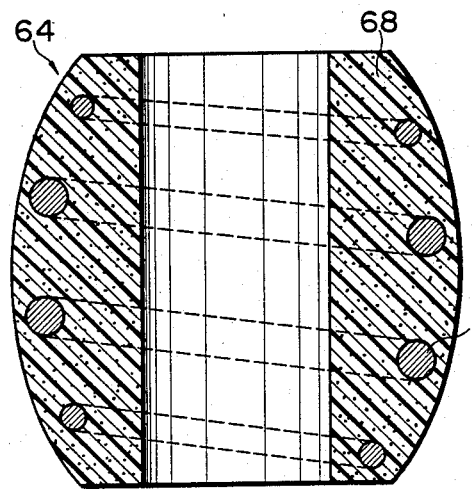
FIG. 8 is a sectional view showing the coil spring assembly used in a fourth embodiment of the vehicle suspension device according to the present invention.

FIG. 8 shows the fourth embodiment of the vehicle suspension device according to the present invention. In the description of the first to third embodiments described above, the coil spring body 34 of the coil spring assembly 32 comprises a cylindrical compression coil spring. However, the shape of this coil spring body 34 is not limited to a cylinder. For example, as shown in FIG. 8, a coil spring body 66 of a coil spring assembly 64 may comprise a barrel-shaped compression coil spring. The central part of the outer circumferential surface of the wall of a cylinder 68 outwardly protrudes in conformity with the outer circumferential surface of the barrel-shaped coil spring so that the coil spring body 66 comprising the barrel-shaped coil spring is completely embedded in the wall of the cylinder 68.

Similar effects as obtained with the other embodiments described above may be obtained with the fourth embodiment having the construction as described above except that the coil spring assembly 64 has spring characteristics particular to the barrel-shaped coil spring.

Figure 9:
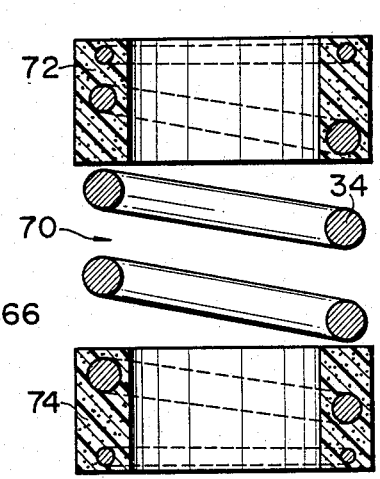
FIG. 9 is a sectional view showing the coil spring assembly used in a fifth embodiment of the vehicle suspension device according to the present invention.

FIG. 9 shows the fifth embodiment of the vehicle suspension device according to the present invention. In the first to fourth embodiments described above, the coil spring body 34 was described as embedded within the overall wall of the cylinder 36. However, adjacent turns of the coil spring of a conventional vehicle suspension device bang against each other mostly at both ends of the coil spring at which the diameter of the spring wire is narrower. Therefore, as shown in FIG. 9, a coil spring assembly 70 has the coil spring body 34 and a pair of foam resin cylindrical portions 72 and 74 which are located at both ends of the coil spring body 34 and in which are embedded at least end turns of narrower diameter than that at the central portion of the spring wire.

The object of the present invention may be accomplished with the construction as described above according to the fifth embodiment. In the fifth embodiment, rust-resistant paint must be applied to the central portion of the coil spring body 34 exposed to the exterior.

Figure 10:
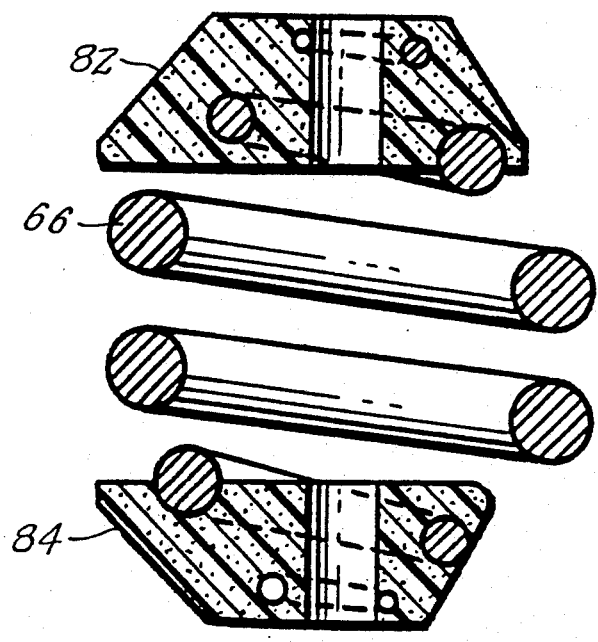
FIG. 10 is a sectional view showing the coil spring assembly used in a sixth embodiment of the vehicle suspension device according to the present invention.

FIG. 10 shows a sixth embodiment of the present invention according to which the coil spring body 66 is of barrel-shape, and only the two ends of the coil spring body 66 are embedded in the walls of cylinders 82 and 84, respectively. The outer circumferential surfaces of the walls of the two cylinders are formed to protrude toward the central parts, conforming to the outer shape of the barrel-shaped coil spring body 66.

What we claim is:

1. A vehicle suspension device which suspends an automotive vehicle body and a wheel, comprising:
    an integrally formed metallic coil spring body having a predetermined number of coaxial turns, said coil spring body having at least one end turn at each opposite end portion thereof, and at least one intermediate turn between said opposite end turns;
    first and second spring holder means at each end portion of said coil spring body, respectively, for seating the respective end portion of said coil spring body;

the vehicle suspension device, including said coil spring, having a given spring constant; and means defining a foam resin generally cylindrical member in which said coil spring body is substantially completely embedded, said generally cylindrical member being arranged between said first and second spring holder means and comprising a soft flexible synthetic resin open-cell foam having surge-proof means and including waterproof means, said waterproof means rendering said foam resin substantially water impermeable, the modulus of elasticity of said open-cell foam being sufficiently small so that said open-cell foam cylindrical member causes substantially no change in said given spring constant of the vehicle suspension device, said generally cylindrical member having a wall extending in the axial direction of said coil spring body in which wall said coil spring body is substantially completely embedded, said wall having a thickness greater than the thickness of the material of said coil spring body as measured in the radial direction of said generallly cylindrical member;

wherein said generally cylindrical member prevents adjacent turns of said coil spring body from contacting one another when surging vibrations are applied to said vehicle suspension system;

said waterproof means comprising a hydrophobic agent in the foam resin in an amount sufficient so that moisture is prevented from permeating the foam resin and reacting with the coil spring body.

2. The vehicle suspension device according to claim 1, wherein said surging-proof means includes a vibration damping agent uniformly mixed in said foam.

3. The vehicle suspension device according to claim 2, wherein said vibration damping agent includes sand powder.

4. The vehicle suspension device according to claim 2, wherein said coil spring body comprises a cylindrical coil spring.

5. The vehicle suspension device according to claim 2, wherein said coil spring body comprises a barrel-shaped coil spring.

6. The vehicle suspension device according to claim 1, wherein said hydrophobic agent is a substance having a hydrophobic property.

7. The vehicle suspension device according to claim 6, wherein said soft synthetic resin open-cell foam includes a soft polyurethane open-cell foam.

8. The vehicle suspension device according to claim 7, wherein said substance having a hydrophobic property includes a reactive silicone.

9. The vehicle suspension device according to claim 8, wherein said generally cylindrical member has an auxiliary hydrophobic agent mixed in said foam.

10. The vehicle suspension device according to claim 9, wherein said auxiliary hydrophobic agent is asphalt.

11. The vehicle suspension device according to claim 9, wherein said auxiliary hydrophobic agent is liquid paraffin.

12. The vehicle suspension device according to claim 9, wherein said substance having a hydrophobic property is petroleum resin.

13. The vehicle suspension device according to claim 9, wherein said auxiliary hydrophobic agent is chlorinated paraffin.

14. The vehicle suspension device according to claim 7, wherein said substance having a hydrophobic property includes a non-reactive silicone.

15. The vehicle suspension device according to claim 14, wherein said non-reactive silicone is dimethyl siloxane.

16. The vehicle suspension device according to claim 15, wherein generally cylindrical member has an auxiliary hydrophobic agent mixed in said foam.

17. The vehicle suspension device according to claim 16, wherein said auxiliary hydrophobic agent is asphalt.

18. The vehicle suspension device according to claim 16, wherein said auxiliary hydrophobic agent is chlorinated paraffin.

19. The vehicle suspension device according to claim 16, wherein said auxiliary hydrophobic agent is liquid paraffin.

20. The vehicle suspension device according to claim 16, wherein said auxiliary hydrophobic agent is petroleum resin.

21. The vehicle suspension device according to claim 1, wherein said waterproof means is made of a substance having water repellency.

22. The vehicle suspension device according to claim 21, wherein said substance having water repellency is polyethylene.

23. The vehicle suspension device according to claim 21, wherein said substance having water repellency is polyurethane.

24. The vehicle suspension device according to claim 21, wherein said substance having water repellency is Neoprene.

25. The vehicle suspension device according to claim 1, wherein said metallic coil spring body comprises a cylindrical coil spring.

26. The vehicle suspension device according to claim 1, wherein said metallic coil spring body comprises a barrel-shaped coil spring.

27. The vehicle suspension device according to claim 26, wherein the outer axially directed circumferential wall surface of said foam resin generally cylindrical member conforms to the outer shape of said barrel-shaped coil spring.

28. The vehicle suspension device according to claim 1, wherein said generally cylindrical member has first and second longitudinal cross-sections, the thickness of said foam of said first longitudinal cross-section being greater than the thickness of said foam of said second longitudinal cross-section.

29. The vehicle suspension device according to claim 28, wherein said coil spring body comprises a cylindrical coil spring.

30. The vehicle suspension device according to claim 28, wherein said coil spring body comprises a barrel-shaped coil spring.

31. The vehicle suspension device according to claim 1, wherein said open-cell foam comprises a vibration damping agent therein which includes iron powder.

* * * * *